(12) United States Patent
Ikuta et al.

(10) Patent No.: US 7,015,607 B1
(45) Date of Patent: Mar. 21, 2006

(54) AC GENERATOR FOR VEHICLE

(75) Inventors: Hiroya Ikuta, Tokyo (JP); Toshiaki Kashihara, Tokyo (JP); Wakaki Miyaji, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/072,263

(22) Filed: Mar. 7, 2005

(30) Foreign Application Priority Data

Sep. 29, 2004 (JP) .......................... P2004-284085

(51) Int. Cl.
*H02K 9/02* (2006.01)
(52) U.S. Cl. .................. 310/64; 310/58; 310/68 D; 310/68 R
(58) Field of Classification Search ............ 310/64, 310/68 D, 68 R, 65, 58
See application file for complete search history.

(56) References Cited

U.S. PATENT DOCUMENTS 5,682,070 A * 10/1997 Adachi et al. ............... 310/71
5,729,063 A * 3/1998 Adachi et al. ............. 310/68 D
6,787,952 B1 * 9/2004 Asao ........................ 310/68 D
2004/0150273 A1 * 8/2004 Fujioka .................... 310/68 D

FOREIGN PATENT DOCUMENTS

JP          8-182279 A        7/1996

* cited by examiner

*Primary Examiner*—Darren Schuberg
*Assistant Examiner*—Erik Preston
(74) *Attorney, Agent, or Firm*—Sughrue Mion, PLLC

(57) ABSTRACT

An AC generator including positive-electrode side and negative-electrode side support members disposed between a casing body and a cooling fan for supporting one-way conducting elements at the positive-electrode side and the negative-electrode side respectively, the positive-electrode side support member and the negative-electrode side support member being arranged on substantially the same plane perpendicular to the rotational shaft, wherein the inner peripheral surface of one of the positive-electrode side support member and the negative-electrode side support member which is located at a farther position from the rotational shaft is inclined so that the dimension in the radial direction thereof is increased from one end surface of the support member concerned at the casing body side to the other end surface of the support member concerned at the fan side.

7 Claims, 21 Drawing Sheets

PRIOR ART

PRIOR ART

PRIOR ART

PRIOR ART

PRIOR ART

PRIOR ART

PRIOR ART

AC GENERATOR FOR VEHICLE

BACKGROUND OF THE INVENTION

1. Field of the Invention

The present invention relates to an AC generator for a vehicle, and particularly to an improvement of a rectifier portion of the AC generator.

2. Description of the Related Art

With respect to this type of AC generators for vehicles, troubles caused by heating of rectifiers mounted in brackets have been hitherto indicated, and there has been proposed such a structure that the cooling efficiency is enhanced without increasing the size of a cooling heat sink (for example, JP-A-8-182279 (hereinafter referred to as "Patent Document 1")).

FIGS. 14 to 20 show a conventional AC generator for a vehicle described in the Patent Document 1, wherein FIG. 14 is a cross-sectional view showing the construction of the conventional AC generator, FIG. 15 is a front view showing the AC generator when it is viewed from the rear side, FIG. 16 is a perspective view showing a rectifier mounted in the conventional AC generator, when it is viewed from the rear side, FIG. 17 is a perspective view showing a state before the rectifier mounted in the conventional AC generator is secured to a circuit board when it is viewed from the front side, FIG. 18 is a cross-sectional view of the main part of the conventional AC generator, and FIGS. 19 and 20 are cross-sectional views showing a diode mounted in the conventional AC generator.

As shown in FIG. 14, a rundle type rotator 7 is freely rotatably mounted through a shaft 6 in a casing body 3 comprising a front bracket 1 and a rear bracket 2 which are formed of aluminum, and a stator 8 is fixed to the inner wall surface of the casing body 3 so as to cover the outer peripheral side of the rotator 7. The shaft 6 is rotatably supported through a pair of bearings 14a, 14b by the front bracket 1 and the rear bracket 2. A pulley 4 is fixed to one end of the shaft 6 so that rotational torque of an engine can be transmitted through a belt (not shown) to the shaft 6.

A slip ring 9 for supplying current to the rotator 7 is Fixed to a rear side end portion of the shaft 6, and a pair of brushes 10 are accommodated in a brush holder 11 disposed in the casing body 3 so as to come into sliding contact with the slip ring 9. A voltage adjuster (regulator) 17 for adjusting the magnitude of an AC voltage occurring in the stator 8 is adhesively attached to a heat sink 18 engagedly fitted in the brush holder 11. A rectifier 12 which is electrically connected to the stator-8 and rectifying AC current occurring in the stator 8 to DC current is mounted in the casing body 3.

The rotator 7 comprises a rotator coil 13 for generating magnetic flux by supplying the rotator coil 13 with current, and a pair of rundle type pole cores 20 and 21 which are equipped so as to cover the rotator coil 13 and whose magnetic poles are generated by the magnetic flux occurring in the rotator coil 13. The pair of pole cores 20 and 21 are formed of iron, equipped with plural pawl-shaped magnetic poles 22 and 23 which are projected at the outer peripheral edges thereof so as to be arranged in the peripheral direction at equal intervals, and fixed to the shaft 6 so that the pawl-shaped pawls 22 and 23 are engaged with each other. Cooling fans Sa and 5b serving as cooling means are fixed to both the end faces of the pole cores 20, 21 in the axial direction.

The stator 8 comprises a stator core 15 and a stator coil 16 which is wound around the stator core 15 and in which AC current is generated by variation of the magnetic flux from the rotator 7 in connection with rotation of the rotator 7. A part of a conducting wire wound around the stator-core 15 extends in the axial direction of the stator core 15, and constitutes a front-side coil end 16f and a rear-side coil end 16r. The stator coil 16 comprises a Y-type three-phase coil formed by connecting three coils to one another in Y-shape.

As shown in FIGS. 16 and 17, the rectifying device 12 comprises substantially arcuate positive-electrode side and negative-electrode side heat sinks 37 and 38 on which diodes 35 and 36 are arranged, and a substantially arcuate circuit board 39. As shown in FIG. 19, each diode 35 is formed by bonding an N-type semiconductor and a P-type semiconductor to achieve a rectifying element 35a having PN-junction, bonding a copper base 35b to the N-type semiconductor of the rectifying element 35a by soldering and also bonding a lead terminal 35c for connection to the circuit board to the P-type semiconductor of the rectifying element 35a, and molding the rectifying element 35a with insulating resin 35d, thereby achieving a substantially rectangular parallelepiped diode 35. On the other hand, as shown in FIG. 20, each diode 36 is formed by bonding an N-type semiconductor and a P-type semiconductor to achieve a rectifying element 36a having PN junction, bonding a copper base 36b to the P-type semiconductor of the rectifying element 36a by soldering, bonding a lead terminal 36c for connection to the circuit board 39 to the N-type semiconductor, and then molding the rectifying element 36a with insulating resin 36d, thereby achieving a substantially rectangular parallelepiped diode 36.

The positive-electrode side heat sink 37 has plural cooling fins 37a which are equipped on the back surface thereof, that is, the opposite surface to the main surface so as to extend radially, and a base 37b for supporting the diodes 35 and diffusing heat of the diodes to the cooling fin 37a efficiently. The positive-electrode side diodes 35 are arranged in a line in the peripheral direction on the main surface (the surface confronting to the cooling fan) of the positive-electrode side heat sink 37 so as to be spaced from one another at a predetermined interval. The flat-plate type bases 35b of the positive-electrode side diodes 35 are connected to the main surface of the base 37b of the positive-electrode side heat sink 37 by soldering. Likewise, the negative-electrode diodes 36 are also arranged in a line in the peripheral direction on the main surface of the negative-electrode side heat sink 38 so as to be spaced from one another at a predetermined interval.

The negative-electrode side heat sink 38 is electrically and thermally connected to the rear bracket 2. Here, the negative-electrode side heat sink 38 is larger in thickness than the base 37b of the positive-electrode side heat sink 37. The positive-electrode side heat sink 37 is located at an inner diameter side in the axial direction, and thus the area thereof is small, so that the diodes 35 are densely arranged on the positive-electrode side heat sink 37. On the other hand, the negative-electrode side heat sink 38 is located at the outer diameter side in the axial direction, and thus the area thereof is large, so that the diodes 36 are dispersedly arranged on the negative-electrode side heat sink 38. In the negative-electrode side heat sink 38, it is necessary to diffuse heat efficiently in order to make uniform in temperature among the respective diodes. Therefore, the negative-electrode side heat sink 38 is required to be large in thickness. For the above reason, the negative-electrode side heat sink 38 is designed to be larger in thickness than the positive-electrode side heat sink 37 although both the positive-electrode side heat sink 37 and the negative-electrode side heat sink 38 have the same function of supporting the diodes and also efficiently diffusing the heat of the diodes. However, the rear bracket 2 to which the negative-electrode side heat sink 38 is connected is equipped with a base 2e which serves as a connection face with the negative-electrode side heat sink 38 and efficiently transmits heat from the negative-electrode side heat sink 38, and plural cooling fins 2d which is equipped on the back surface of the base 2e so as to extend radially.

The positive-electrode side heat sink 37 and the negative-electrode side heat sink 38 are coaxially arranged so that the main surfaces thereof are located on substantially the same plane perpendicular to the shaft 6. At this time, the positive-electrode side diodes 35 and the negative-electrode side diodes 36 are electrically connected to the stator coil 16 by the circuit board 39, and three-phase alternating current occurring in the stator coil 16 is rectified into direct current. In the AC generator for a vehicle thus constructed, current is supplied from a battery (not shown) through the brush 10 and the slip ring 9 to the rotator coil 13 to generate magnetic flux. The pawl-shaped magnetic pole 22 of one pole core 20 is magnetized to N-pole by this magnetic flux, and the pawl-shaped magnetic pole 23 of the other pole core 21 is magnetized to S-pole by the magnetic flux. Furthermore, rotational torque of an engine is transmitted through a belt and a pulley 4 to a shaft 6, and the rotator 7 is rotated. Therefore, rotational magnetization field is applied to the stator coil 16, and electromotive force is generated to the stator coil 16. This AC electromotive force is rectified to DC power through the rectifying device 12, and charged in the battery while the magnitude thereof is adjusted by a voltage adjuster 17.

In the conventional vehicle AC generator as described above, the rotator coil 13, the stator coil 16, the rectifying device 12 and the voltage adjuster 17 are heated at all times during power generation. For example, with respect to generators having a rated output current level of 100A, heat quantities of 60 W, 500 W, 120 W and 6W are generated for the above parts at a rotational point at which the temperature of each part is high. Excessive heating deteriorates the performance of the generator, and causes reduction in lifetime of the parts. Therefore, in order to cool the parts thus heated by the power generation, air intake holes 1a, 2a, 2c and exhaust holes 1b and 2b are equipped in the front bracket 1 and the rear bracket 2.

First, at the rear side, outside air is sucked into the case 3 through the air intake holes 2a and 2c by rotation of the cooling fan 5b at the rear side, and impinges against the positive-electrode side heat sink 37, so that it flows along the cooling fin 37a toward the shaft 6, and passes through the gap between the shaft 6 and the positive-electrode side heat sink 37 toward the rotator 7 as indicated by a dashed line of FIG. 21. Thereafter, the outside air is deflected in the centrifugal direction by the rear-side cooling fan 5b to cool the rear-side coil end 16r of the stator coil 16, and then discharged through the exhaust hole 2b to the outside. Furthermore, at the front side, outside air is sucked through the air intake hole 1a into the case 3, deflected in the centrifugal direction by the front-side cooling fan Sa to cool the front-side coil end 16f of the stator coil 16, and then discharged through the exhaust hole 1b to the outside.

Recently, the output of alternators has been enhanced. When the output of an alternator is enhanced, the heat quantity of the diodes 35, 36 equipped to the rectifying device is increased, and thus the temperature of the diodes 35, 36 is also increased. When the temperature of the diodes 35, 36 is increased, cracks occur in the soldering used to bond the rectifying elements 35a, 36a to the copper bases 35b, 36b due to thermal fatigue, and finally the diodes 35, 36 are broken. Therefore, it is required to enhance the cooling performance of the heat sink for cooling the diodes 35, 36. The structure of the conventional device has the following two main ventilation passages extending to the fan: (A) bracket fin 2d→positive-electrode side fin 37a→fan 5b and (B) air intake hole 2a→positive-electrode side fin 37a→fan 5b. The positive-electrode side heat sink 37 is cooled by the fin 37a equipped to the heat sink 37, and the negative-electrode side heat sink 38 is cooled mainly by the fin 2d equipped to the bracket 2. The positive-electrode side heat sink 37 is located inside in the axial direction, and thus it can be cooled by air flowing through the ventilation passages (A) and (B) However, the negative-electrode side heat sink 38 is located outside in the axial direction, and thus it is cooled by only air flowing through the ventilation passage (A).

As a general method of enhancing the cooling performance of the heat sink, it is considered that the surface area of the fins is increased or the amount of air passing over the fins is increased. The cooling performance of the positive-electrode side heat sink 37 can be enhanced by increasing the length of the fins or the number of fins to thereby increase the surface area of the fins. However, when the surface area of the bracket fin 2d is increased to enhance the cooling performance of the negative-electrode side heat sink 38, the fin interval (pitch) is reduced, and the draft resistance of the bracket fin 2d is increased, so that the amount of air flowing through the ventilation passage (A) is reduced and the amount of air flowing through the ventilation passage (B) is increased as shown in FIG. 21.

Therefore, the amount of air for cooling the negative-electrode side heat sink 38 is reduced, and thus the cooling performance of the heat sink is rather deteriorated. That is, the negative-electrode side is located outside in the axial direction, and thus it is impossible to cool the negative-electrode side by increasing the surface area thereof unlike the positive-electrode side.

Next, a method of increasing the amount of air passing over the bracket fin 2d without changing the number of the bracket fins will be explained. This method is a method of deleting the inner peripheral portions of the negative-electrode side heat sink 38 and the base 2e of the rear bracket 2 as shown in FIG. 22. That is, the dimension S in the radial direction is shortened. With this structure, the amount of air flowing between the negative-electrode side heat sink 38 and the positive-electrode side heat sink 37 is increased, and the air flows in the bracket fin 2d smoothly, so that the cooling performance of the negative-electrode side can be enhanced.

However, (a) most of air flowing through the ventilation passage (A) passes between the negative side-electrode heat sink 38 and the positive-electrode side heat sink 37, and thus the amount of air flowing into the positive-electrode side heat sink 37 is reduced, so that the cooling performance of the positive-electrode side heat sink 37 is lowered.

As described above, in the structure of the conventional device, the negative-electrode heat sink 38 and the positive-electrode side heat sink 37 are located substantially on the same plane. Therefore, it has an advantage that the device can be shortened in the axial direction and thus miniaturized, however, it is difficult to enhance the cooling performance of the negative-electrode side heat sink 38 without deteriorating the cooling performance of the positive-electrode side heat sink 37 because the negative-electrode side heat sink 38 is located outside in the axial direction.

SUMMARY OF THE INVENTION

The present invention has been implemented to solve the foregoing problems, and has a first object to provide an AC generator for a vehicle which can enhance the cooling performance of a negative-electrode side heat sink without deteriorating the cooling performance of a positive-electrode side heat sink. Furthermore, the present invention has a second object to provide an AC generator for a vehicle which can increase a ventilation amount with simple means without increasing the number of cooling fins of the negative-electrode side heat sink.

In order to attain the above objects, according to the present invention, an AC generator for a vehicle which comprises a rotator mounted in a casing body so as to be freely rotatably supported through a rotational shaft, a cooling fan equipped to the rotator so as to vent outside air into the main body of the generator, and positive-electrode side and negative-electrode side support members disposed between the casing body and the cooling fan for supporting one-way conducting elements at the positive-electrode side and the negative-electrode side respectively, the positive-electrode side support member and the negative-electrode side support member being arranged on substantially the same plane perpendicular to the rotational shaft, is characterized in that the inner peripheral surface of one of the positive-electrode side support member and the negative-electrode side support member which is located at a farther position from the rotational shaft is inclined so that the dimension in the radial direction thereof is increased from one end surface of the support member concerned at the casing body side to the other end surface of the support member concerned at the fan side.

According to the present invention, the cooling performance of the negative-electrode side heat sink can be enhanced without affecting the cooling performance of the positive-electrode side heat sink, and also increase a ventilation amount by relatively simple means without increasing the number of cooling fins of the negative-electrode side heat sink.

DETAILED DESCRIPTION OF THE PREFERRED EMBODIMENTS

Preferred embodiments according to the present invention will be described hereunder with reference to the accompanying drawings.

First Embodiment

Figure 1:
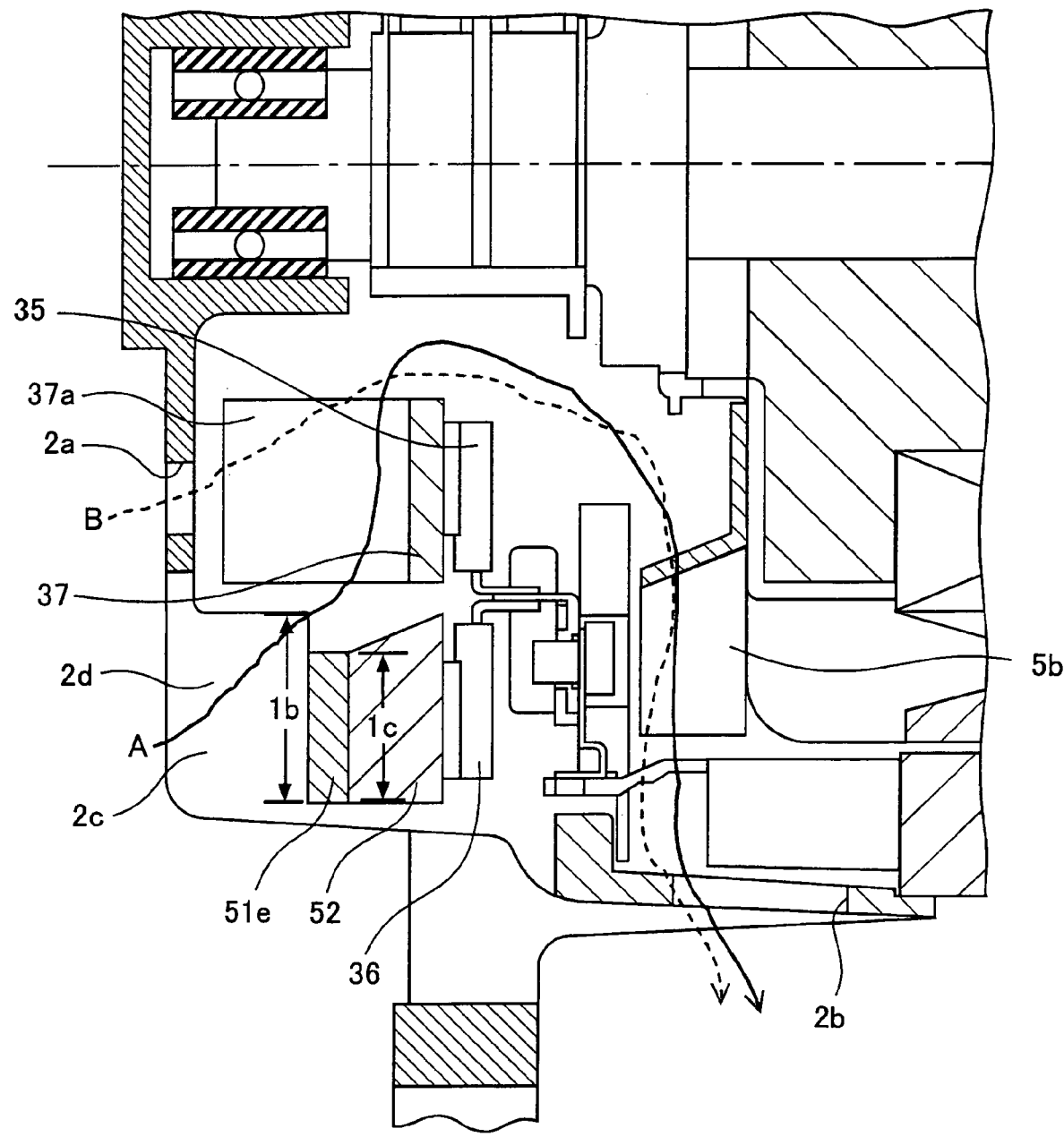
FIG. 1 is a cross-sectional view showing the main part of an AC generator for a vehicle according to a first embodiment of the present invention.
Figure 2:
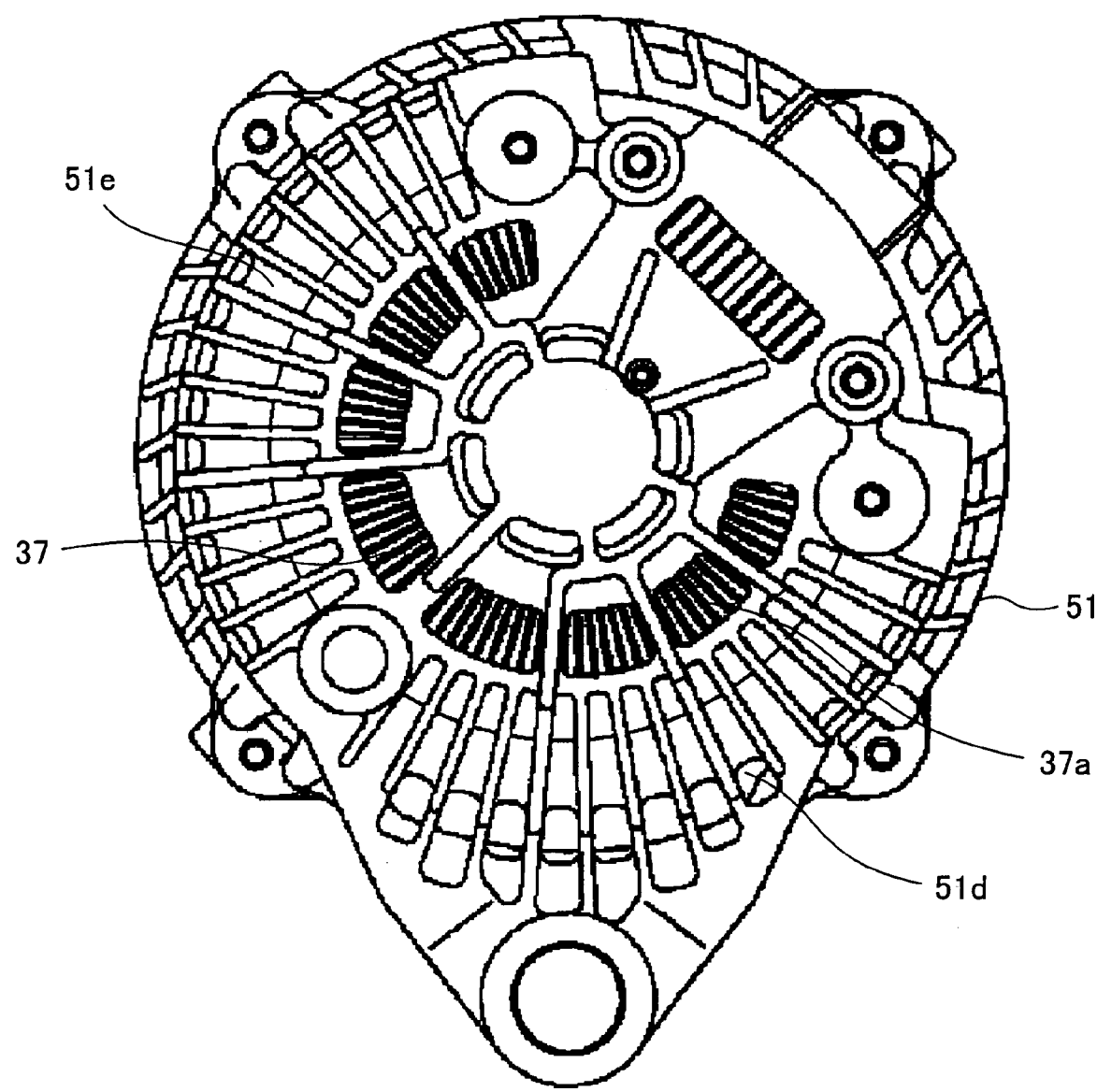
FIG. 2 is a perspective view showing a rectifying device mounted in the AC generator of the present invention when it is viewed from the rear side.
Figure 3:
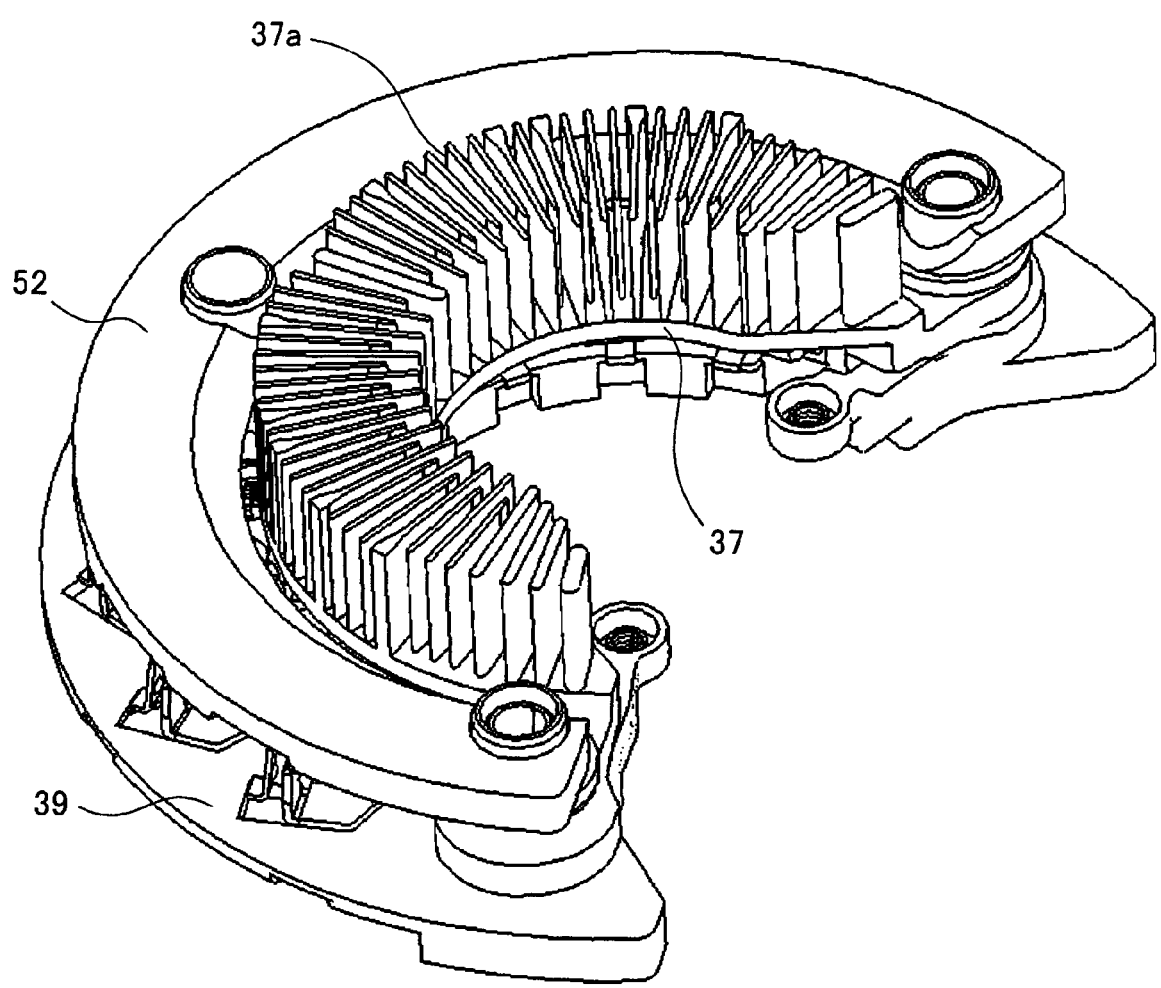
FIG. 3 is a perspective view showing the rectifying device of the present invention.

FIG. 1 is a cross-sectional view showing the main part of an AC generator for a vehicle according to the present invention, FIG. 2 is a perspective view showing a rectifying device mounted in the AC generator of the present invention when it is viewed from the rear side, and FIG. 3 is a perspective view showing the rectifying device of the present invention.

The construction of this embodiment is substantially the same as the conventional AC generator, and the different point from the conventional AC generator shown in FIG. 1 resides in that the inner periphery of the negative-electrode side heat sink 52 is inclined so that the dimension in the radial direction thereof is increased from an end face thereof at the casing body to the other end face thereof at the fan side, and also the inner periphery of the rear bracket base 51e is deleted.

Figure 4:
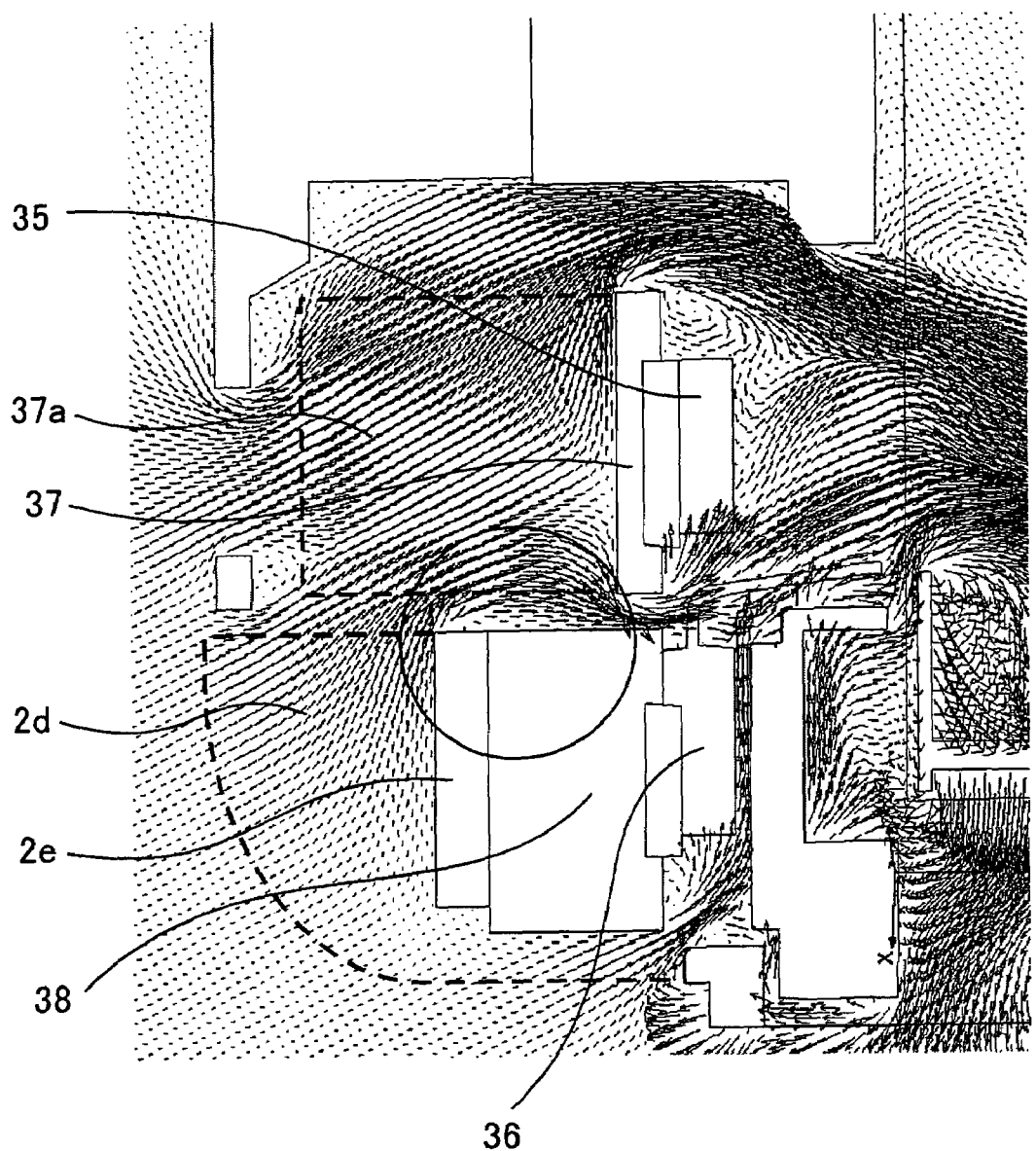
FIG. 4 is a flow rate distribution diagram when thermal fluid analysis is carried out on a conventional AC generator for a vehicle.
Figure 5:
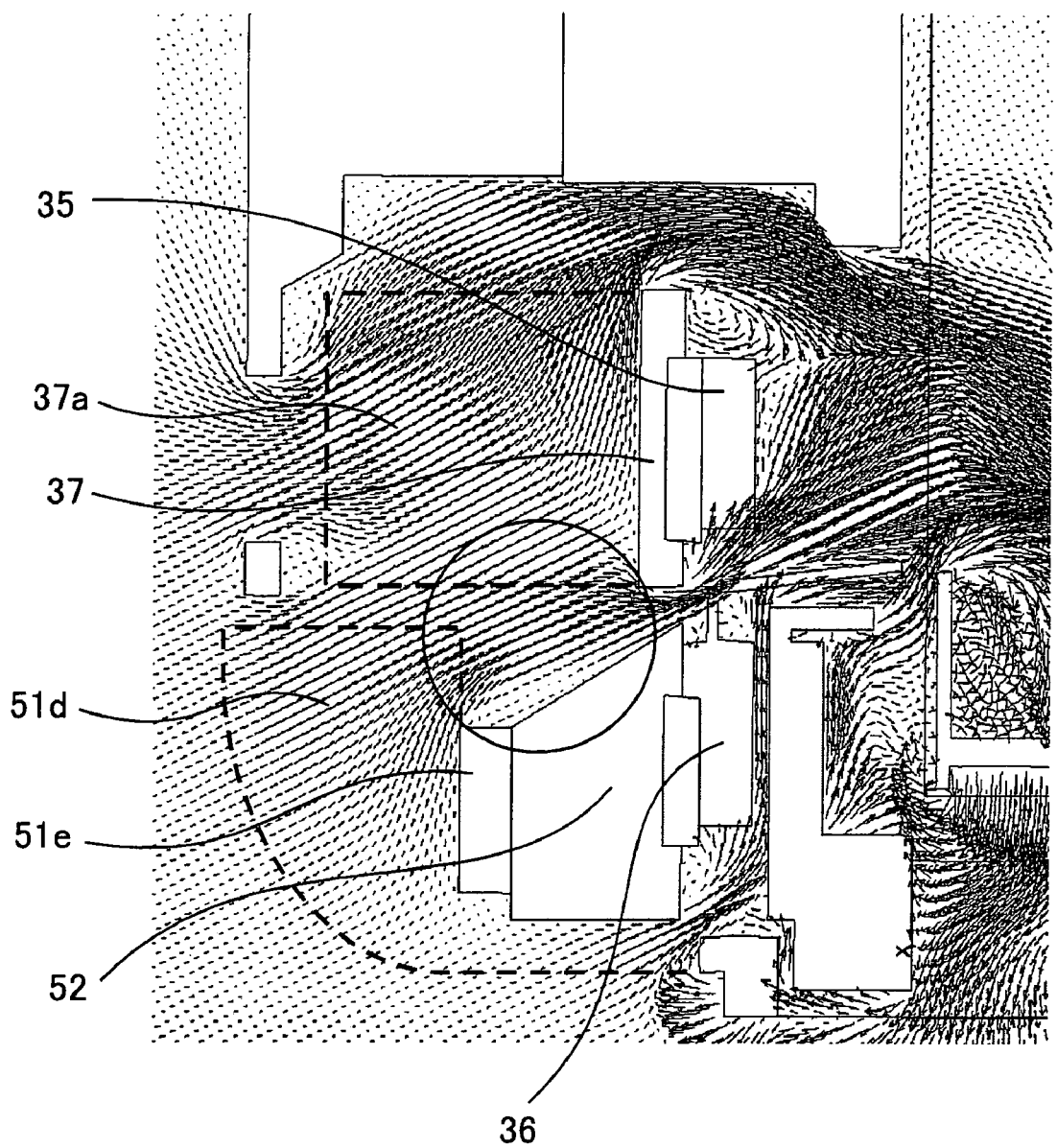
FIG. 5 is a flow-rate distribution diagram when thermal fluid analysis is carried out on the AC generator of the present invention.
Figure 6:
FIG. 6 is a flow-rate distribution diagram when thermal fluid analysis is carried out on a conventional AC generator for a vehicle.
Figure 7:
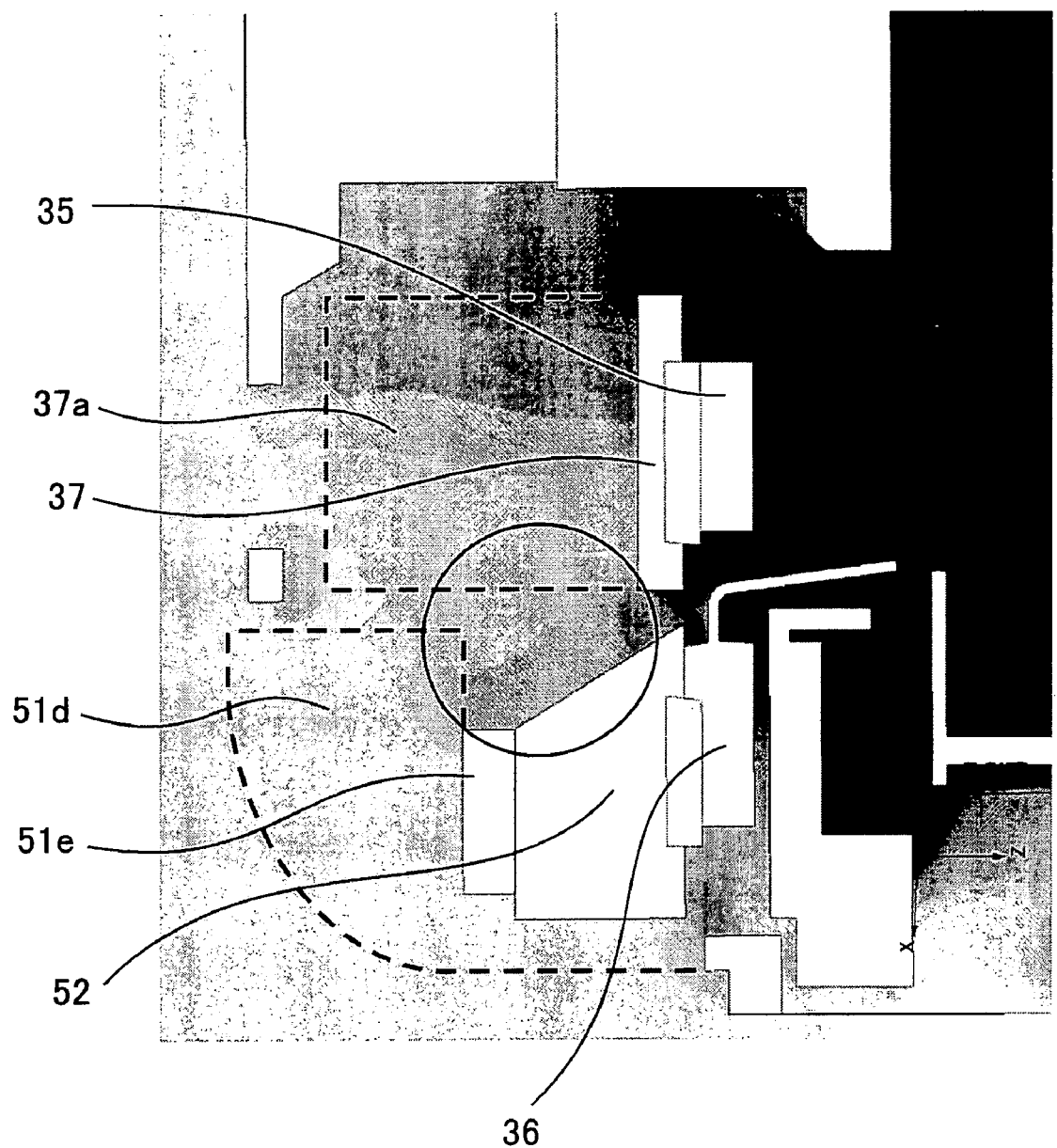
FIG. 7 shows a pressure distribution when thermal fluid analysis is carried out on the AC generator of the present invention.

FIG. 4 shows a flow-rate distribution when thermal fluid analysis is carried out on the conventional AC generator, FIG. 5 shows a flow-rate distribution when thermal fluid analysis is carried out on the AC generator of the present invention, FIG. 6 shows a flow-rate distribution when thermal fluid analysis is carried out on the conventional AC generator, and FIG. 7 shows a pressure distribution when thermal fluid analysis is carried out on the AC generator of the present invention. As is apparent from FIG. 4, air is exfoliated at the inner peripheral side of the negative-electrode heat sink (a portion surrounded by a circle) and air flow is not smooth in the case of the conventional AC generator. In FIG. 6, the pressure decreases as the color is darker, and it is apparent from FIG. 6 that the pressure is reduced at the exfoliation portion. That is, it is considered that reduction in pressure means that pressure loss, that is, energy loss of air flow is large at the exfoliation portion.

According to the AC generator of the present invention, as is apparent from FIG. 5, the air flow is smooth although air exfoliation occurs slightly. As is apparent from FIG. 7, the reduction in pressure at the portion surrounded by a circle is small in comparison with FIG. 6. That is, it is apparent that the energy loss of the air flow is small. No loss of the air-flow energy means increase of the air flow amount, and as a result of the actual thermal fluid analysis, it has been found that the amount of air flowing into the ventilation passage (A) is increased in the present invention by 12% as compared with the conventional AC generator. Furthermore, from the thermal fluid analysis, the rise-up temperature of the positive-electrode side diodes was equal to 111° C. and the rise-up temperature of the negative-electrode side diodes was equal to 111° C. in the AC generator of the present invention while the rise-up temperature of the positive-electrode side diodes was equal to 111° C. and the rise-up temperature of the negative-electrode side diodes was equal to 116° C. in the conventional AC generator under an atmosphere of 20° C., that is, it is found that the present invention has a temperature reducing effect of reducing the temperature of the negative-electrode side diodes by 5 degrees.

Figure 8:
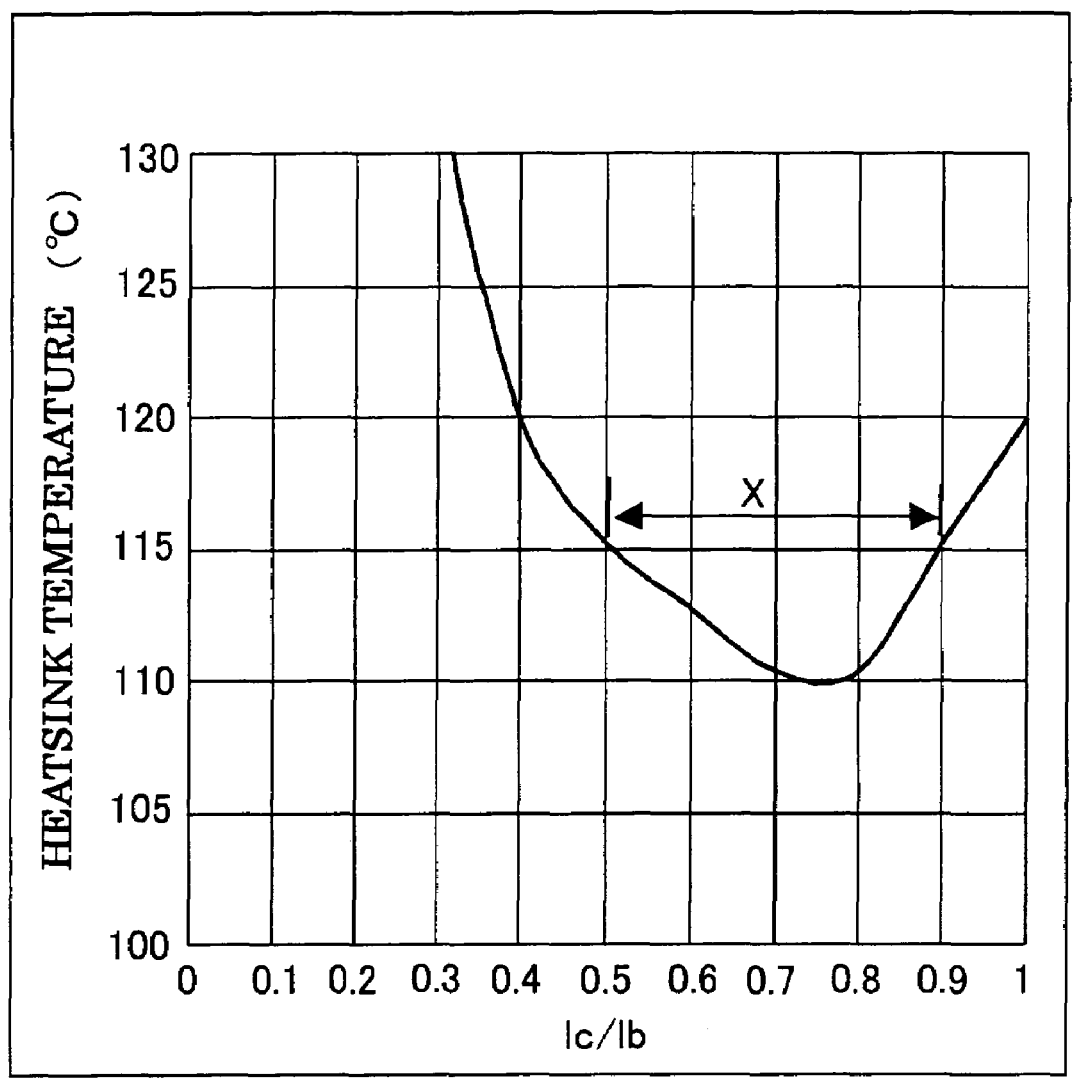
FIG. 8 is a characteristic diagram showing the contact area of a negative-electrode side heat sink and a rear bracket base and a heat transfer efficiency.

Therefore, when an actual experiment was carried out, it was found that the temperature of the positive-electrode side diodes was equal to 114° C. and the temperature of the negative-electrode side diodes is equal to 120° C. in the conventional AC generator while the temperature of the positive-electrode side diodes is equal to 113° C. and the temperature of the negative-electrode diodes was equal to 113° C. according to the present invention, that is, the present invention had the temperature reducing effect of 7 degrees for the negative-electrode side diodes. When the length in the radial direction of the contact face the negative-electrode side heat sink 52 with the rear bracket base 51$e$ is represented by 1$c$ and the length from the outer diameter of the contact face to the inner diameter of the fin 2$d$ is represented by 1$b$, as the length 1$c$ is reduced relatively to the length 1$b$, air flows to the fin more efficiently, however, the contact area between the negative-electrode side heat sink 52 and the rear bracket base 51$e$ is reduced, so that the heat transfer efficiency from the negative-electrode side heat sink 52 to the rear bracket base 51$e$ is lowered. The value of 1$c$/1$b$ and the cooling performance have a relationship as shown in FIG. 8. The ordinate axis of FIG. 8 represents the temperature of the heat sink of this embodiment and the abscissa axis represents the value of 1$c$/1$b$. From FIG. 8, this embodiment has an effect for 0.5<1$c$/1$b$<0.9 (X in FIG. 8).

Second Embodiment

Figure 9:
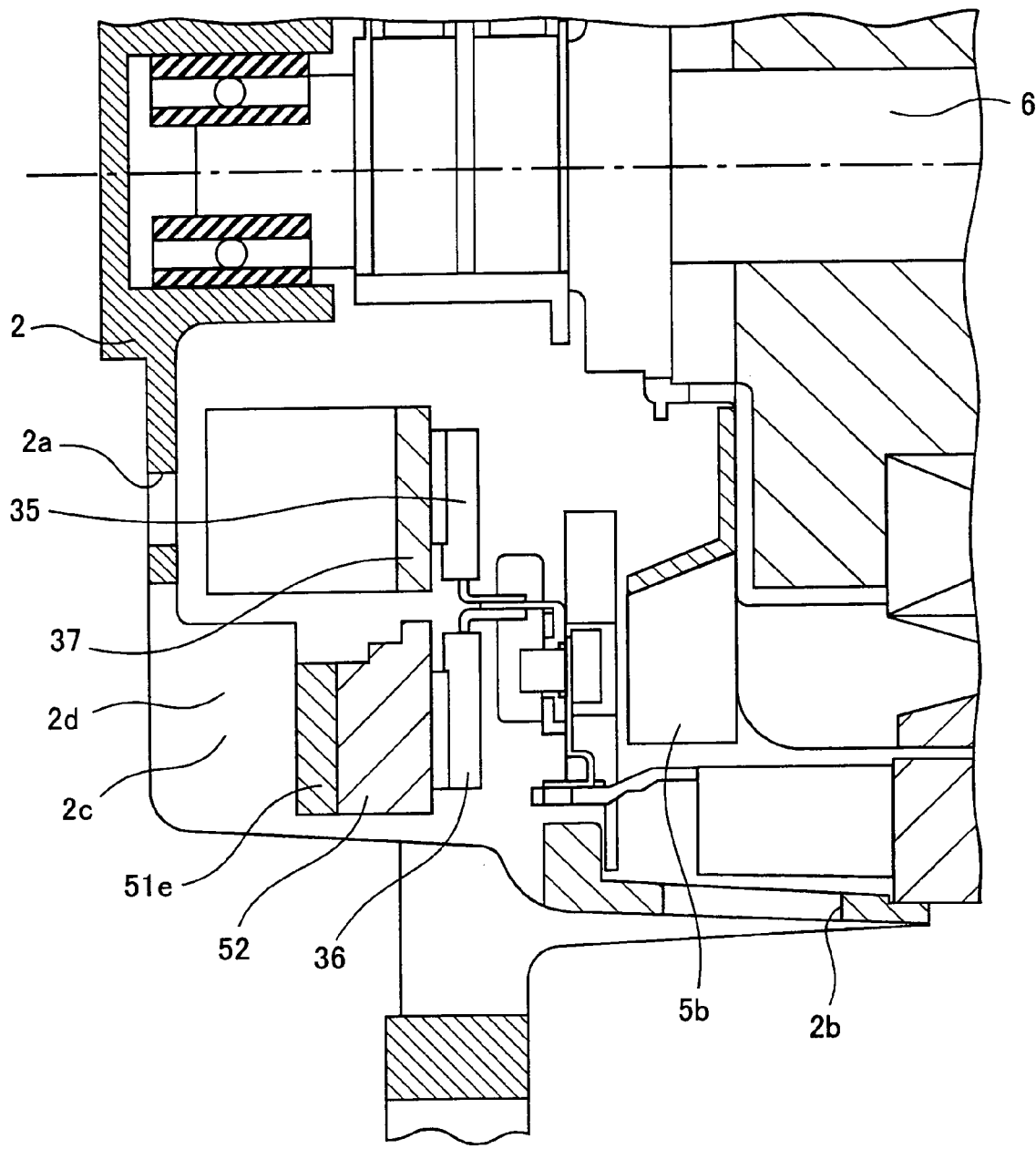
FIG. 9 is a cross-sectional view showing the main part of an AC generator for a vehicle according to a second embodiment of the present invention.
Figure 10:
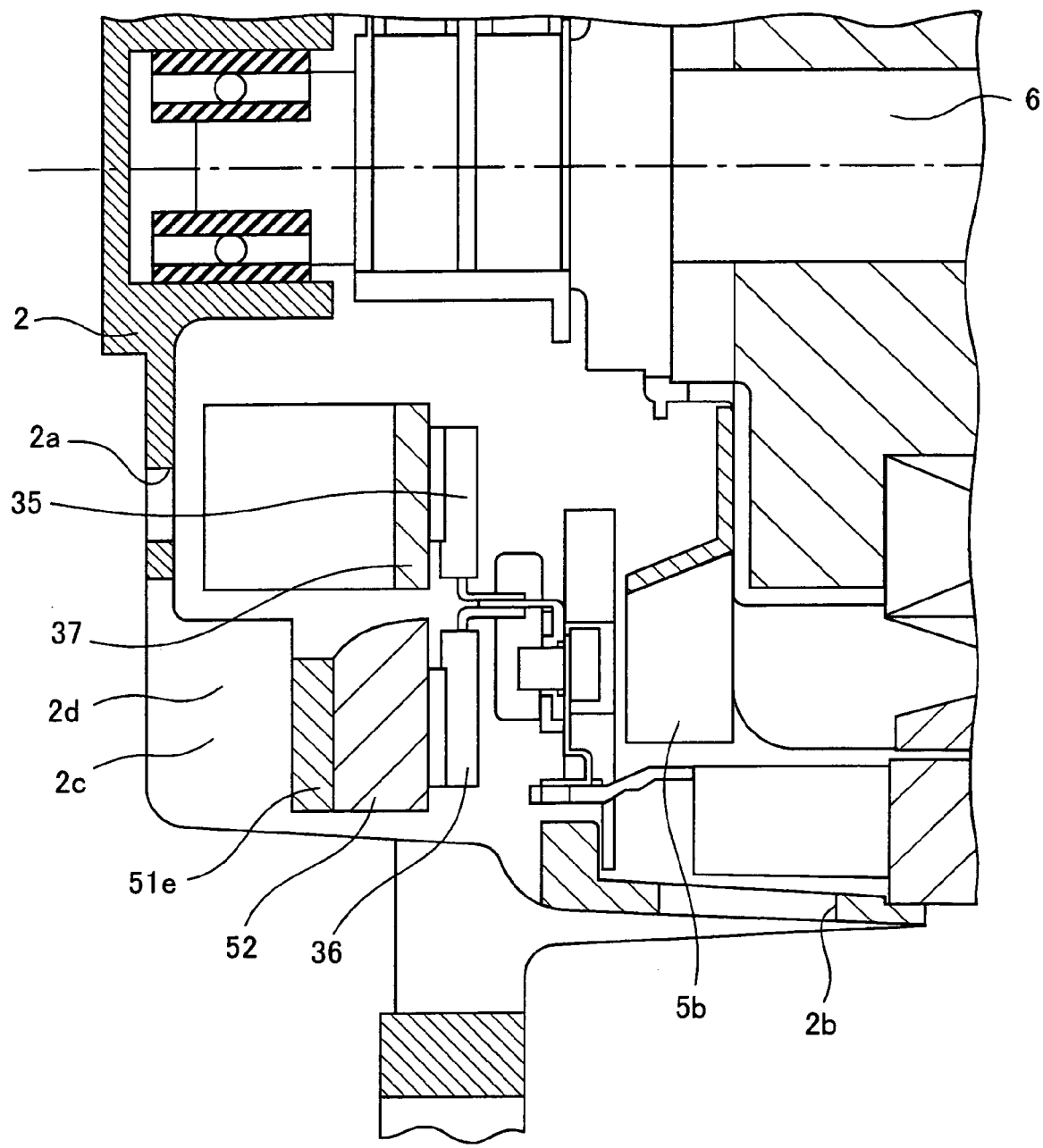
FIG. 10 is a cross-sectional view showing the main part of the AC generator according to the second embodiment of the present invention.
Figure 11:
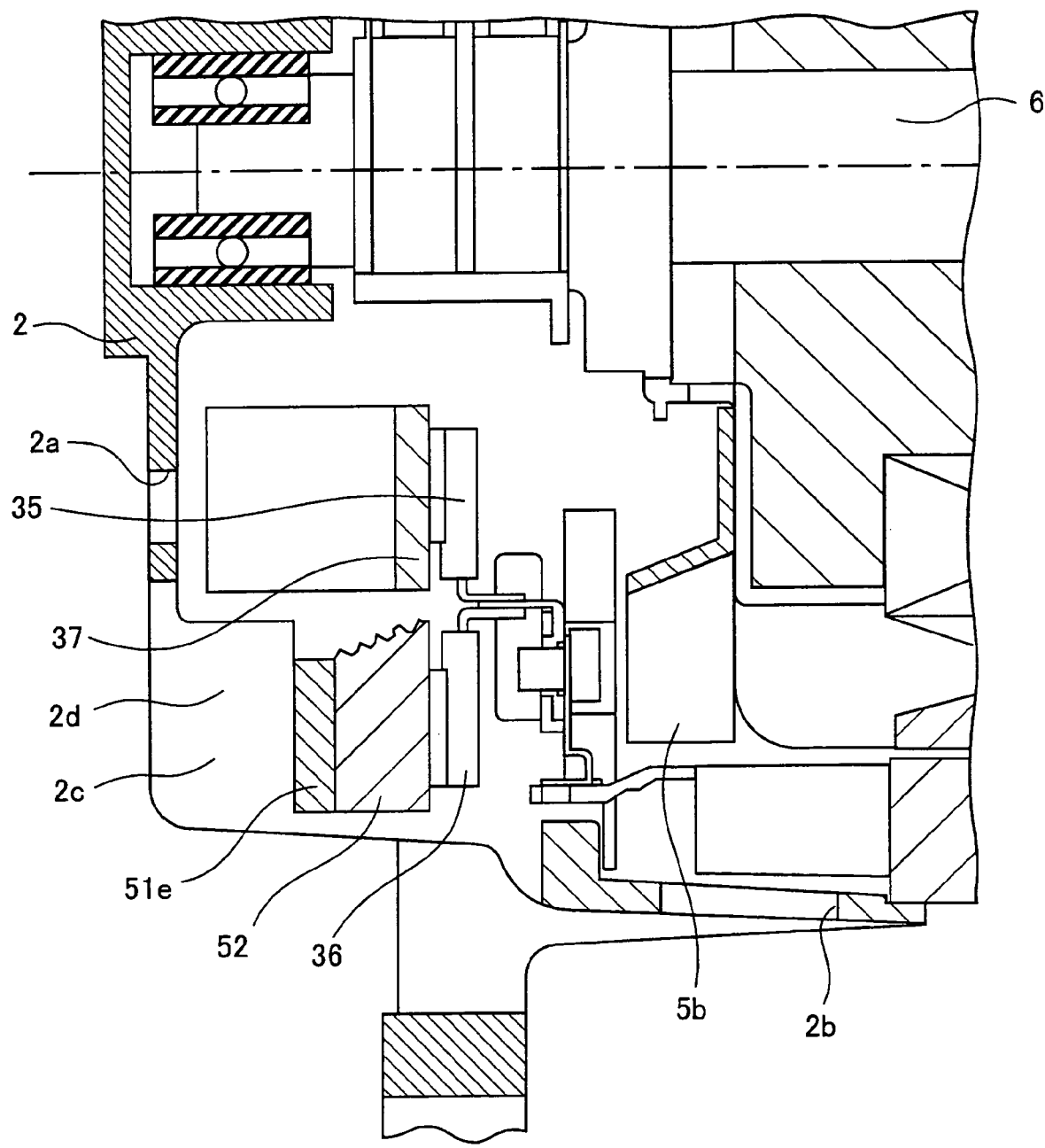
FIG. 11 is a cross-sectional view showing the main part of the AC generator according to the second embodiment of the present invention.

The thermal fluid analysis and the experiment were carried out in the style that the negative-electrode side heat sink 52 is straightly inclined. However, the same effect of enhancing the cooling performance as described above can be achieved in the case of such a style that the dimension in the radial direction of the negative-electrode heat sink 52 is stepwise inclined from the end face thereof at the bracket 2 side to the end face thereof at the cooling fan 5$b$ side as shown in FIG. 9, or the dimension in the radial direction is inclined like a curved line as shown in FIG. 10. The same effect of enhancing the cooling performance is achieved irrespective of the inclining manner, and the cooling performance can be further enhanced by providing dimples or fins to the inclined portion as shown in FIG. 11.

Third Embodiment

Figure 12:
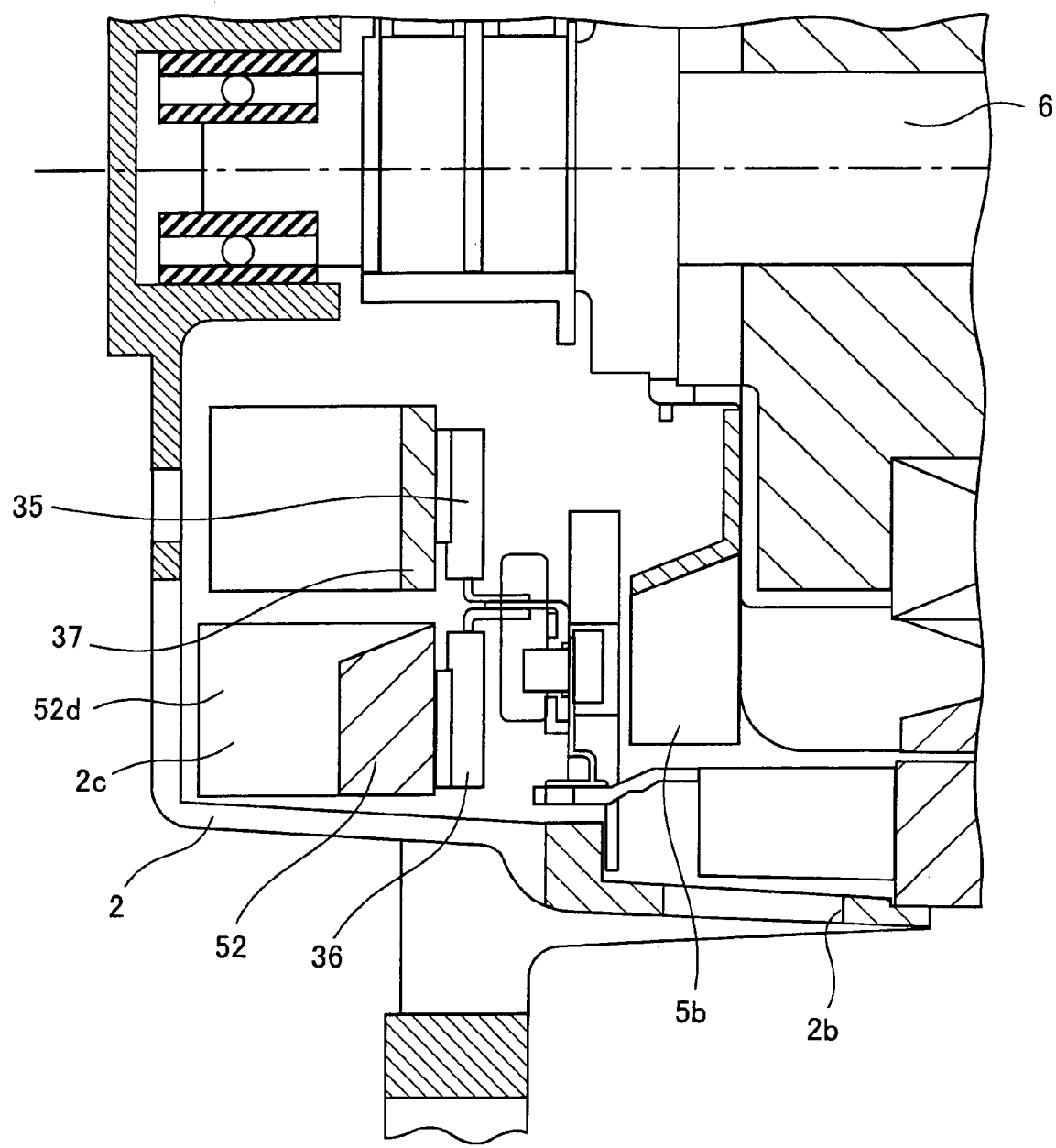
FIG. 12 is a cross-sectional view showing the main part of the AC generator according to a third embodiment of the present invention.
Figure 13:
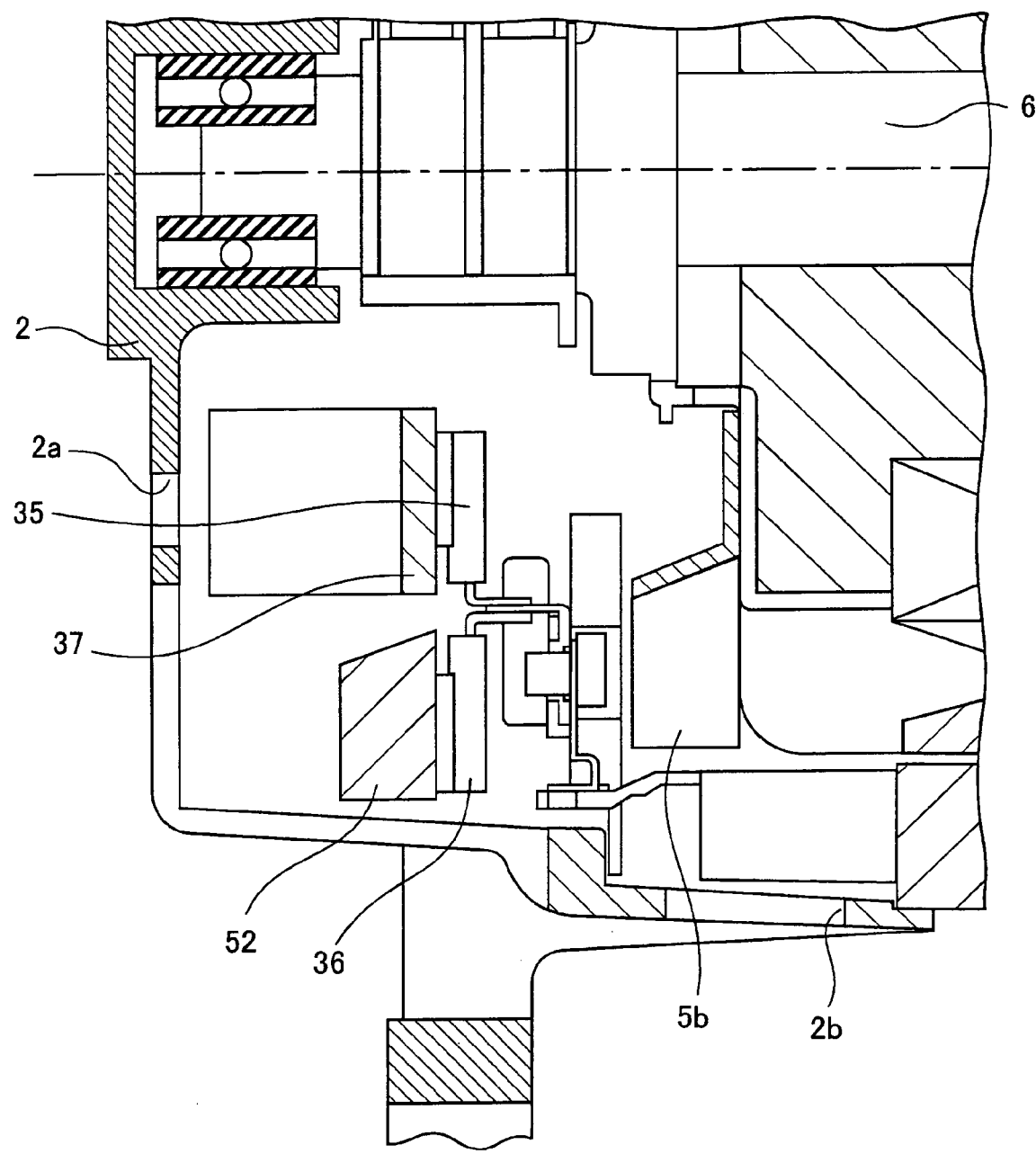
FIG. 13 is a cross-sectional view showing the main part of an AC generator for a vehicle according to a modification of the third embodiment of the present invention.
Figure 14:
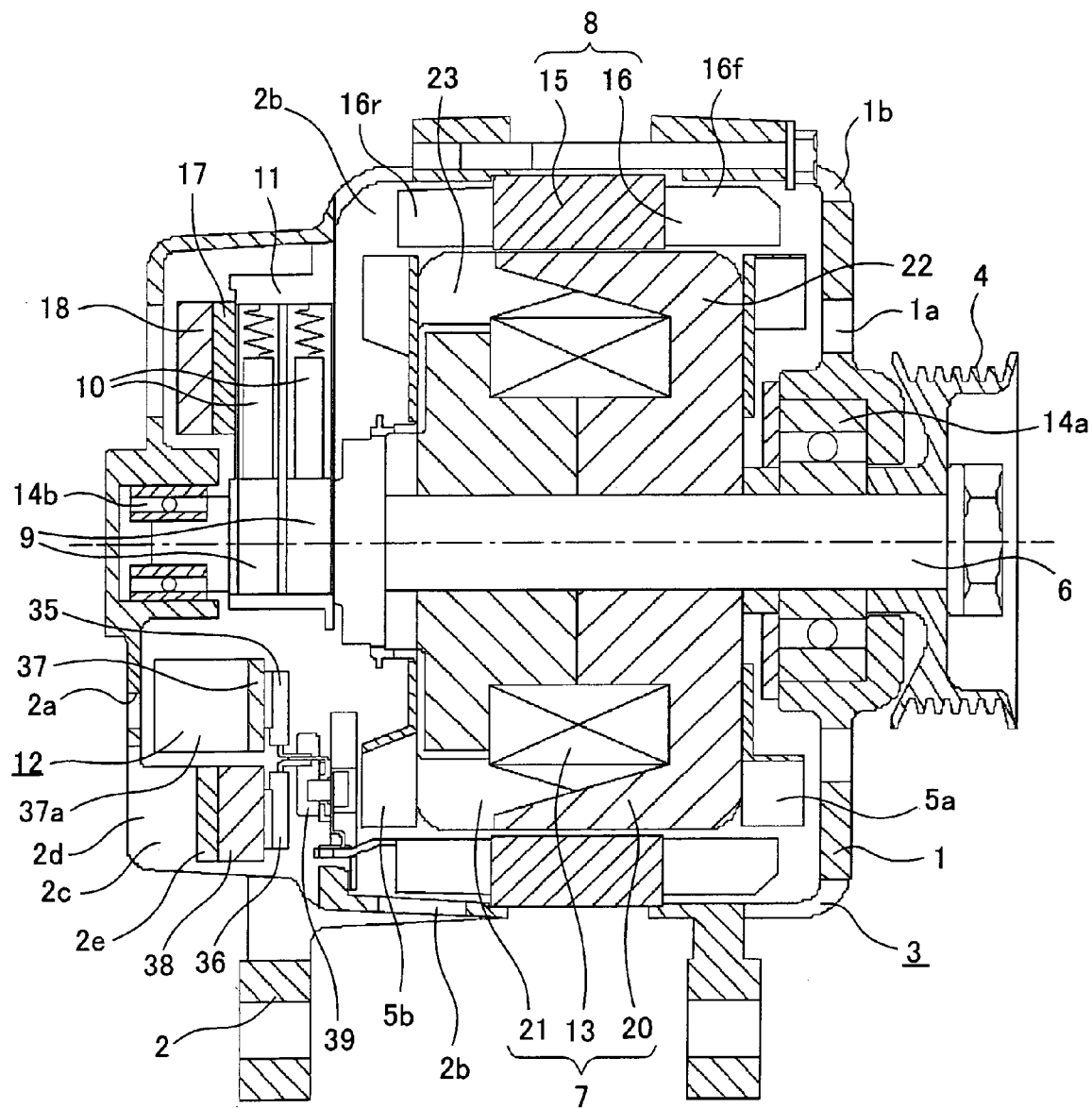
FIG. 14 is across-sectional view showing the construction of a conventional AC generator for a vehicle.
Figure 15:
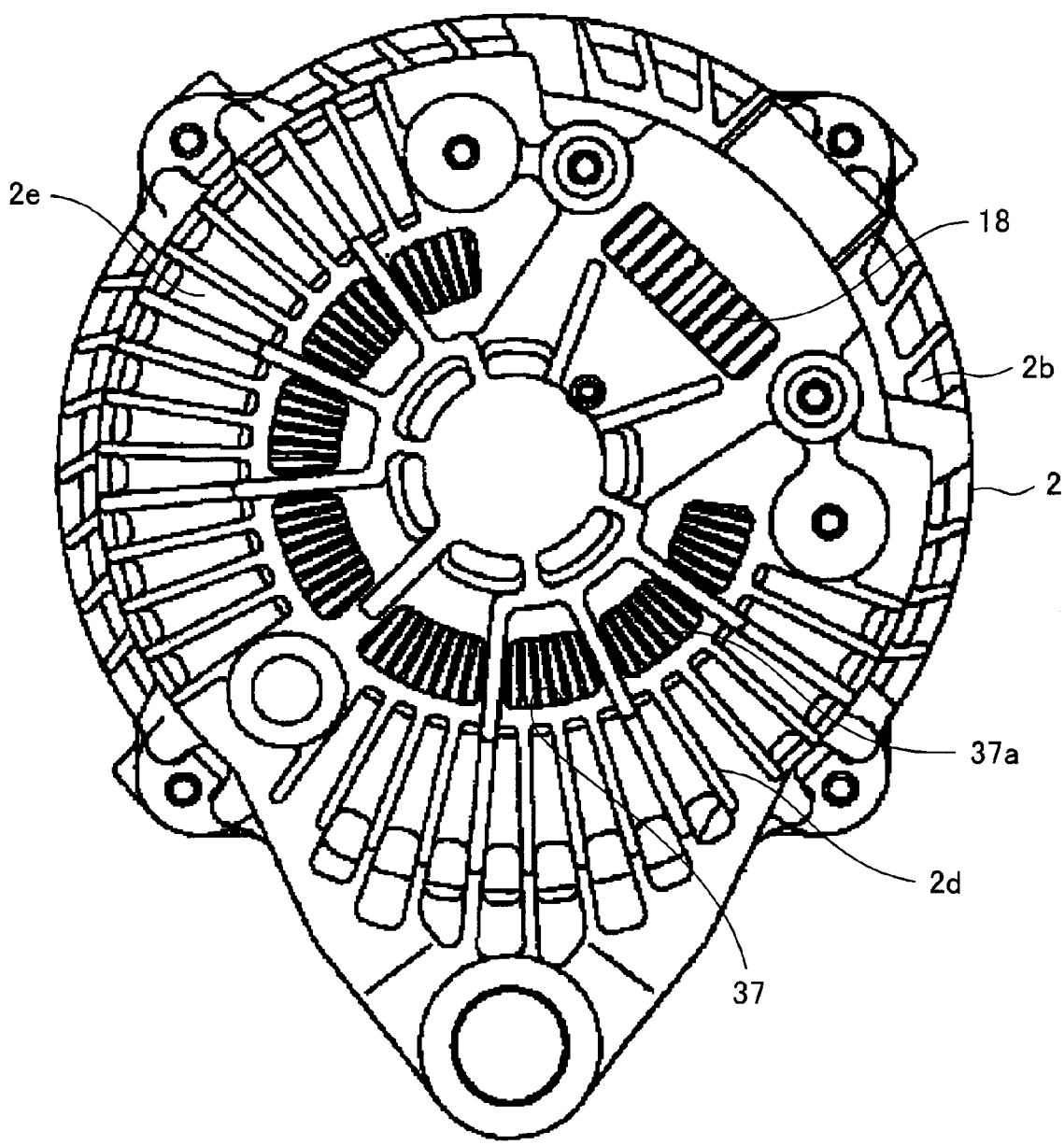
FIG. 15 is a front view showing the AC generator when it is viewed from the rear side.
Figure 16:
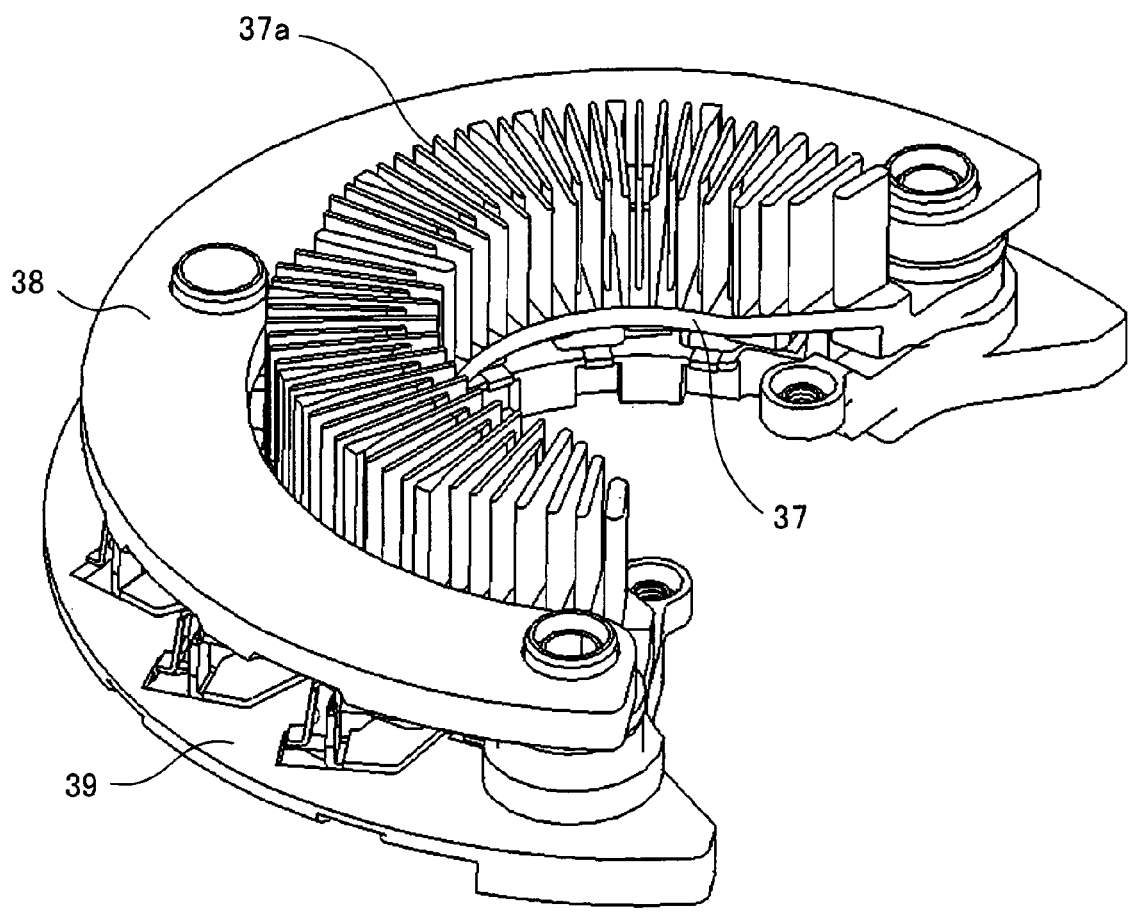
FIG. 16 is a perspective view showing a rectifying device mounted in the conventional AC generator when it is viewed from the rear side.
Figure 17:
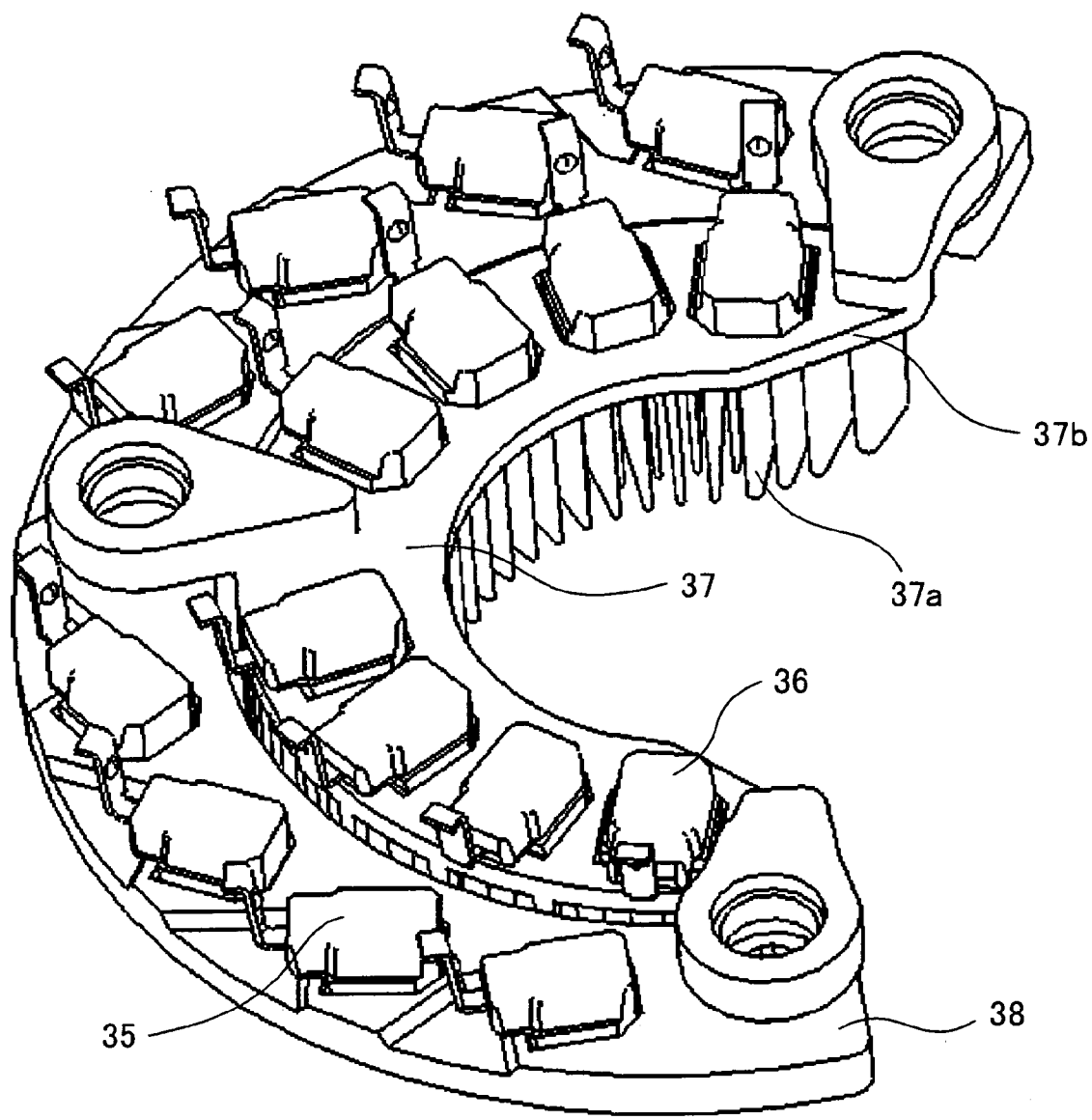
FIG. 17 is a perspective view showing a state of the rectifying device mounted in the conventional AC generator before the rectifying device is mounted on a circuit board when it is viewed from the front side.
Figure 18:
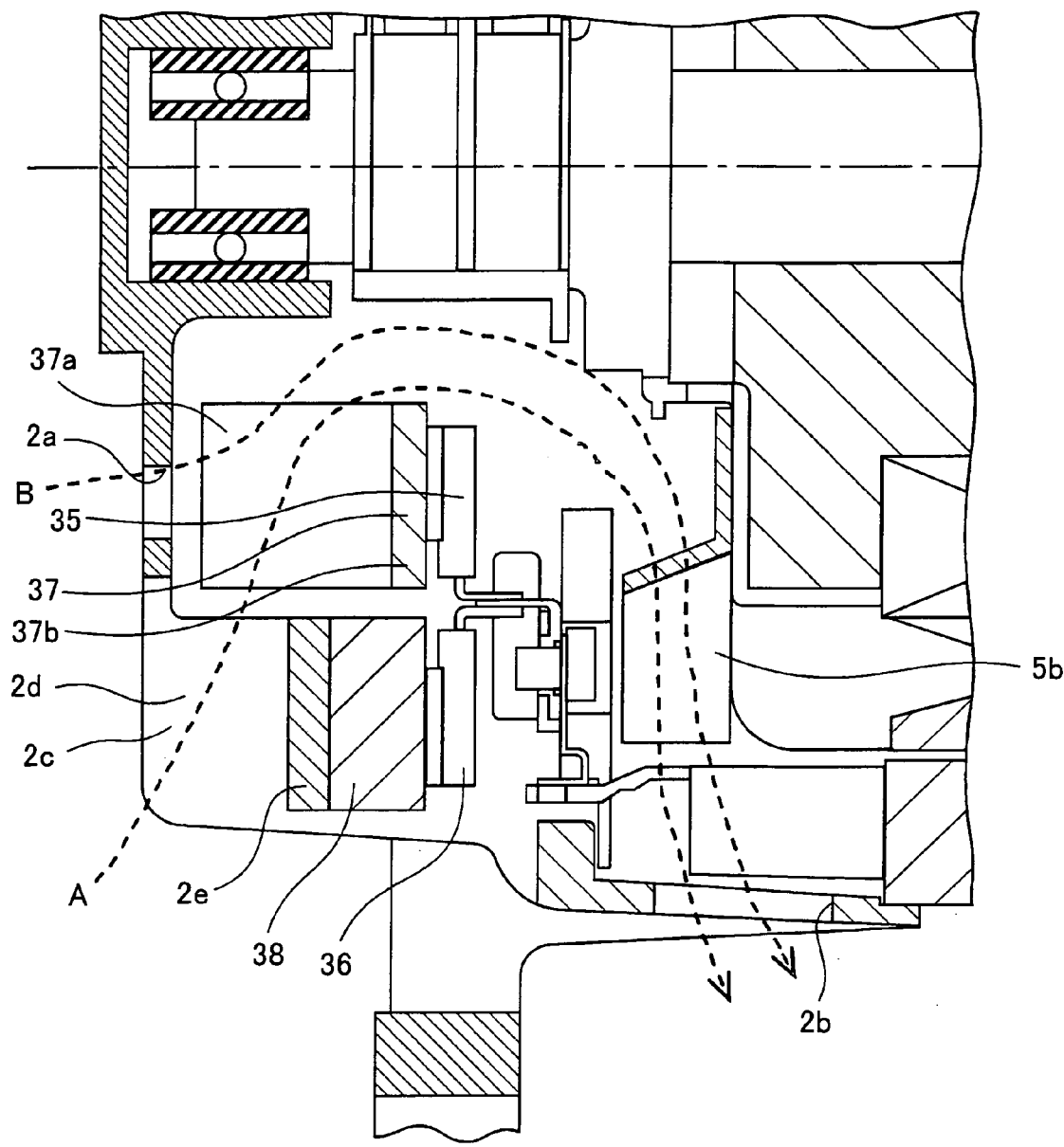
FIG. 18 is a cross-sectional view showing the main part of the conventional AC generator.
Figure 19:
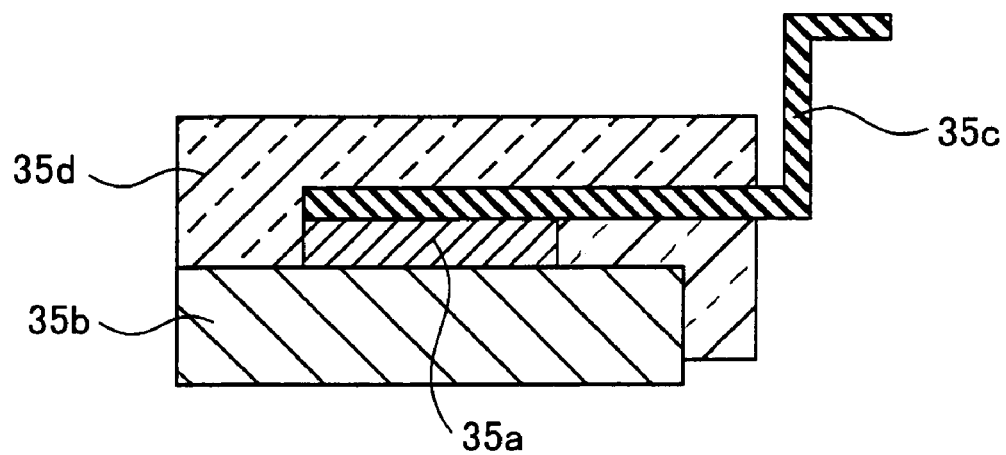
FIG. 19 is a cross-sectional view showing positive-electrode side diodes mounted on the conventional AC generator.
Figure 20:
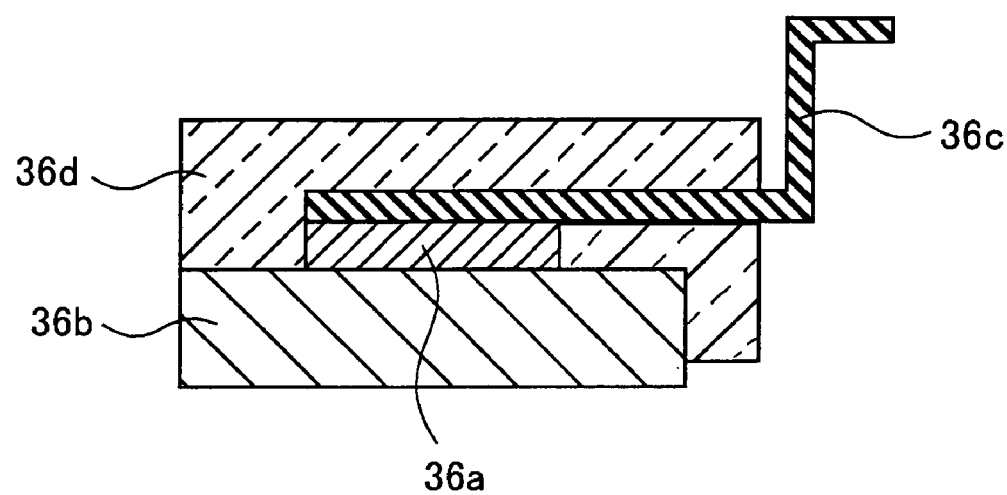
FIG. 20 is a cross-sectional view showing negative-electrode side diodes mounted on the conventional AC generator.
Figure 21:
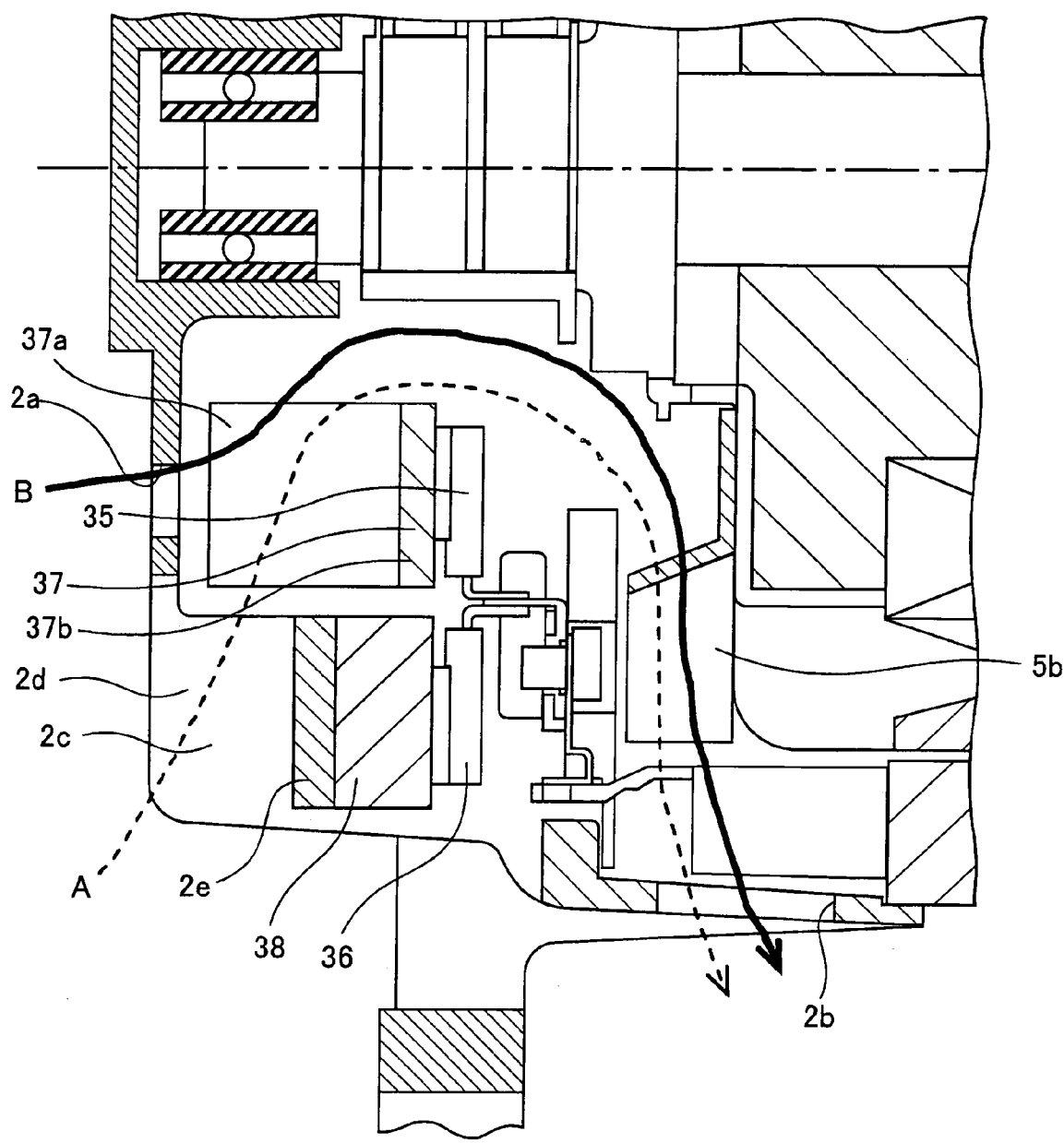
FIG. 21 is a cross-sectional view showing the main part of the AC generator to explain an air flowing condition.
Figure 22:
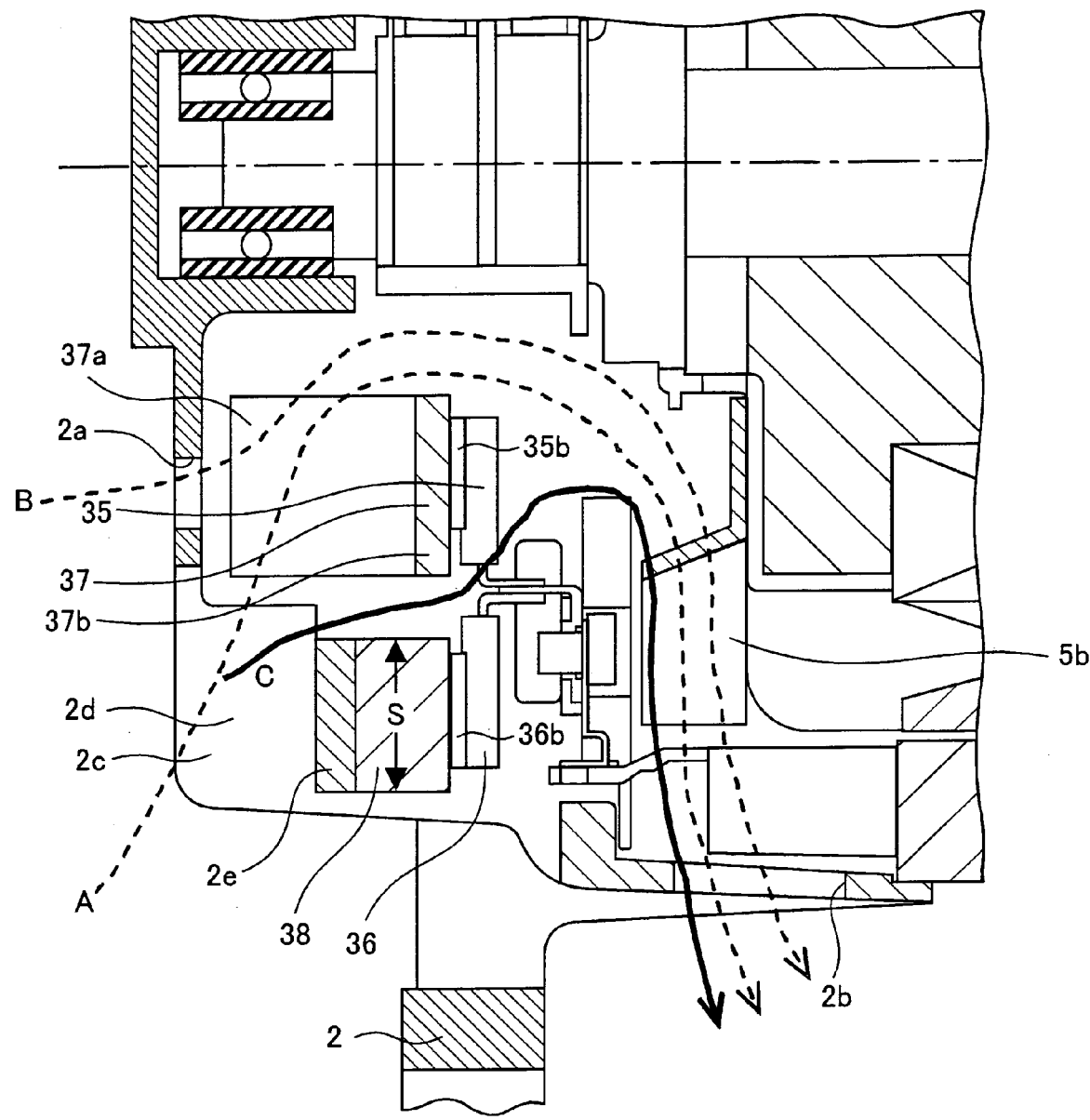
FIG. 22 is a cross-sectional view showing the main part of the AC generator to explain another example of the air flowing condition.

The effect of the present invention has been proved by the thermal fluid analysis and the experiment for the AC generator according to the above embodiments. However, the same effect can be achieved in an AC generator for a vehicle in which the positive-electrode side heat sink and the negative-electrode side heat sink are arranged on substantially the same plane as the rotational shaft without confounding each other in the radial direction, for example, even in such a structure that the negative-electrode side heat sink 52 is directly equipped with the fin 52$d$ without interposing the rear bracket 2 therebetween, and accommodated in the rear bracket 2 as shown in FIG. 12. Furthermore, in FIG. 12, the fin 52$d$ is illustrated as a straight fin. However, the shape of the fin is not limited to the straight fin, and any shape such as a pin fin or the like may be adopted to achieve the same effect. Furthermore, in the case of an AC generator having a low output and a small heat quantity, the same effect can be achieved if no fin is provided as shown in FIG. 13.

In the above embodiments, the diodes are designed as a rectangular mold type. However, the shape of the diodes is not limited to the specific shape, and the same effect can be achieved irrespective of the shape of the diodes. For example, an arcuate type diodes can provide the same effect.

What is claimed is:
1. An AC generator for a vehicle comprising a rotator mounted in a casing body so as to be freely rotatably supported through a rotational shaft, a cooling fan equipped to the rotator so as to vent outside air into a main body of the generator, and positive-electrode side and negative-electrode side support members disposed between the casing body and the cooling fan for supporting one-way conducting elements at the positive-electrode side and the negative-electrode side respectively, the positive-electrode side support member and the negative-electrode side support member being arranged on substantially the same plane perpendicular to the rotational shaft, wherein the inner peripheral surface of one of the positive-electrode side support member and the negative-electrode side support member which is located at a farther position from the rotational shaft is inclined so that the dimension in the radial direction thereof is increased from one end surface of the support member concerned at the casing body side to the other end surface of the support member concerned at the fan side,
    wherein the end surface at the casing body side of the support member located at a farther side from the rotational shaft is firmly fixed to the casing body, and the casing body on which the support member is fixed is provided with cooling fins projecting in the rotational shaft direction and inwardly in the radial direction, and
    wherein the ratio 1$c$/1$b$ of a length 1$c$ in the radial direction of the fixed end surface and a length 1$b$ from the outer diameter of the fixed end surface to the inner diameter of the fins satisfies 0.5<1$c$/1$b$<0.9.

2. The AC generator according to claim 1, wherein the inner peripheral surface of one of the positive-electrode side support member and the negative-electrode side support member which is located at a farther side from the rotational shaft is designed so that the dimension in the radial direction thereof is stepwise increased from the end surface of the support member concerned at the casing body side to the end surface thereof at the fan side.

3. The AC generator according to claim 1, wherein the inner peripheral surface of one of the positive-electrode side support member and the negative-electrode side support member which is located at a farther side from the rotational shaft is designed so that the dimension in the radial direction thereof is increased from the end surface of the support member concerned at the casing body side to the end surface thereof at the fan side like a curved line.

4. The AC generator according to claim 1, wherein the end surface at the casing body side of the support member located at a farther side from the rotational shaft is equipped with cooling fins projecting in the rotational shaft direction and inwardly in the radial direction.

5. The AC generator according to claim 1, wherein said inner peripheral surface is configured such that it has a slope that is constant as the inner peripheral surface extends from a point at said one end surface to a point at said other end surface.

6. The AC generator according to claim 1, wherein the inner peripheral surface is configured such that it has a slope that continuously changes as the inner peripheral surface extends from a point at said one end surface to a point at said other end surface.

7. The AC generator according to claim 1, wherein the inner peripheral surface comprises dimples.

* * * * *